United States Patent [19]

Margulies

[11] 4,395,842
[45] Aug. 2, 1983

[54] ROACH TRAPS

[75] Inventor: Herman Margulies, South Orange, N.J.

[73] Assignee: Sterling Drug Inc., New York, N.Y.

[21] Appl. No.: 268,657

[22] Filed: Jun. 1, 1981

Related U.S. Application Data

[63] Continuation-in-part of Ser. No. 101,794, Dec. 10, 1979, abandoned.

[51] Int. Cl.³ .......................... A01M 1/10; A01M 1/14
[52] U.S. Cl. .......................................... 43/114; 43/121
[58] Field of Search ................ 43/107, 114, 115, 121, 43/131, 132 R; 206/601, 620, 626, 523; 150/0.5; 229/43; D22/19

[56] References Cited

U.S. PATENT DOCUMENTS

| 241,913 | 5/1881 | Blackwood | 43/121 |
| D. 257,442 | 10/1980 | Nakai | D22/19 |
| 1,804,891 | 5/1931 | Newman | 43/131 |
| 2,242,099 | 5/1941 | Wittner et al. | 43/121 X |
| 3,307,603 | 3/1967 | Swett | 150/0.5 |
| 3,491,914 | 1/1970 | Elzey | 206/523 X |
| 3,802,116 | 4/1974 | Meguro et al. | 43/121 |
| 3,908,302 | 9/1975 | Carr | 43/121 |
| 3,913,259 | 10/1975 | Nishimura et al. | 43/114 |
| 3,940,874 | 3/1976 | Katsuda | 43/114 |
| 4,030,233 | 6/1977 | Wunsche | 43/121 |
| 4,208,828 | 6/1980 | Hall et al. | 43/114 |
| 4,214,400 | 7/1980 | Patmore et al. | 43/121 |

FOREIGN PATENT DOCUMENTS 15793 of 1894 United Kingdom .................. 43/121

Primary Examiner—Nicholas P. Godici
Assistant Examiner—Charles L. Willis
Attorney, Agent, or Firm—Wenderoth, Lind & Ponack

[57] ABSTRACT

Roach traps of the adhesive type with openings thereto adapted to provide enhanced thigmotropic stimulation to entering roaches. The traps are readily fabricated and are extremely effective.

5 Claims, 6 Drawing Figures

ROACH TRAPS

This is a continuation-in-part of Ser. No. 101,794, filed Dec. 10, 1979, now abandoned.

BACKGROUND OF THE INVENTION

The present invention relates to roach traps of the adhesive type, i.e. traps which capture the roach by inducing it to become mired in an adhesive contained therein.

Adhesive-type roach traps have recently been gaining in popularity over insecticides or traps which employ a poisoned bait, because the adhesive traps offer obvious environmental advantages.

Roaches are known to be thigmotropic insects. They like to be caressed, combed or touched and therefore are attracted to environments which provide such thigmotropic stimulation.

Roaches also love darkness and are, therefore, attracted to dark environments.

Despite the fact that the foregoing behavioral information is known, roach traps in general, and adhesive-type traps in particular, have not been designed to provide an environment which fully satisfies the roach's natural inclination for thigmotropic stimulation and darkness.

THE PRIOR ART

Nishimura et al., U.S. Pat. No. 4,044,495 discloses a roach trap of the adhesive type having a stepping plate which is preferably inclined inwardly and upwardly to enable a roach to easily crawl up into the trap where it is retained in an adhesive at the base of the trap. The stepping plate may have a rough surface provided by perforations. It is further appreciated by this reference that roaches have a very highly developed tactile sense. However, the trap does not appear to be designed to provide maximum thigmotropic stimulation.

Katsuda, U.S. Pat. No. 3,940,874 discloses a roach trap in the form of a box having roach admitting openings which are much narrower at the base than at the top. In one preferred embodiment, the opening is in the shape of an inverted triangle, i.e. in which the apex constitutes the bottom of the opening. While such arrangement may fortuitously provide some thigmotropic stimulation, this is not the objective of the arrangement. Rather the inverted triangular opening is intended to prevent the roach from turning around while traversing the entrance.

On the other hand, Carr, U.S. Pat. No. 3,908,302 discloses a trap having pyramid-shaped entrances of different sizes to offer the possibility of capturing different sizes and types of roaches. The patent appears to be based on the discovery that American roaches are most likely to enter an opening which is about ¾ to ⅞ inches across whereas the German roaches are most likely to pass through an opening about 3/16 to ⅜ inches across. However, Carr fails to appreciate the provision of thigmotropic stimulation as a design factor.

It is therefore an object of the present invention to provide a roach trap which takes full advantage of the roach's desire for thigmotropic stimulation and darkness.

It is a further object to provide a trap which satisfies the foregoing objective and is also easy to manufacture.

BRIEF SUMMARY OF THE INVENTION

These and other objects are achieved by the present invention wherein the roach must traverse a low entranceway having a rough bottom surface. The rough bottom surface provides the requisite thigmotropic stimulation to the bottom of the roach, and the low top surface provides such stimulation to the back of the roach.

Additionally, the narrow (vertical) openings tend to make the trap darker and more attractive to the roach.

DETAILED DESCRIPTION OF THE INVENTION

The roach traps of this invention are outstandingly and surprisingly effective despite superficial similarities to those presently available.

One of the main advantages of the present traps, in addition to their effectiveness, is the ease with which they can be manufactured.

Typically, the present traps comprise a base or roach collecting tray and a cover for the tray.

The base can be readily molded from any thermoformable plastic such as polyvinyl chloride, polypropylene or polystyrene.

The desired rough surface at the base of the entrance to the trap can be molded into the base so as to provide a texture approximating that of a sandblasted finish.

In a preferred embodiment, there is provided such a thermoformed base over which a cover having one or more suitable roach-admitting openings can be snapped into place.

In a further preferred embodiment, the cover plate is heat-sealed to a thermoformed base. Thus, the trap is of a non-complex construction and can be readily manufactured from two or, at most, three plastic parts.

During the production of the base, the conventional adhesive composition, or adhesive plus bait attractant composition, can be applied after the thermoforming operation in the conventional manner.

The thermoformed plastic traps with low openings may, if desired, be provided with openings which are punched out mechanically prior to use.

The traps are preferably black in color, particularly on the inside surfaces, in order to provide a dark environment.

The roach is initially attracted to the trap by its configuration and the attractant, if present. Once inside the opening of the trap, it comes into contact with the adhesive/bait composition which limits the movement of the roach thus preventing it from returning to the opening of the trap.

Preferred embodiments of the invention will now be described with reference to the accompanying drawings.

Figure 1:
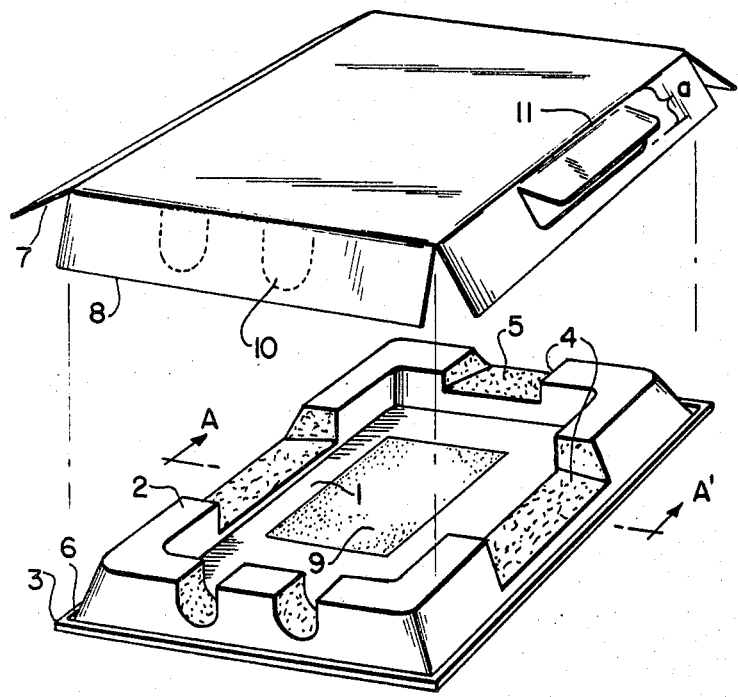
FIG. 1 is an exploded view, in perspective, of an embodiment of the present invention comprising a roach collecting tray and cover therefor.

In FIG. 1, roach collecting tray 1 is surrounded by inner wall 2 and outer wall or flange 3.

The inner wall is relatively thicker and higher than the outer wall or flange and the inner wall has the outer surface sloping inwardly and upwardly with respect to the outer wall and a space or groove 6 is left therebetween.

The inner wall is provided with at least one roach admitting opening 4, having a roughened surface at the stepping plate 5 thereof.

Preferably a plurality of openings of different sizes are provided in the wall 2 at spaced intervals therealong, and at least one of such openings must have the inventive configuration defined hereinbelow in terms of the vertical dimension thereof.

The stepping plate 5 of each opening 4 is preferably a flat surface inwardly and upwardly inclined toward the interior of the trap but at a smaller angle of inclination than the outer surface of wall 2.

The roach collecting tray 1 can be molded by thermoforming into a unitary structure in the conventional manner.

The rough surface of stepping plate 5 can also be provided in the molding operation.

The outer wall 3 must be sufficiently low to enable a roach to traverse it and enter the trap through opening 4 in said inner wall.

Cover 7 comprises a relatively flat panel having flaps 8 depending from the periphery thereof, the flaps being engaged in and retained by the groove 6 between the inner and outer walls of the tray, while fitting snugly against the inner wall.

The cover is provided with perforations 10 aligned with each opening 4 in the inner wall of the tray and which define the entrances into the trap. If desired, the perforations 10 can be located along only three sides of the generally rectangular section defining the openings but left unperforated along its fourth upper side so as to define a hinged tab 11 which can be punched out of the flap and swung around the hinge at the top of the flap to the open position.

The vertical dimension of the opening defined by the perforations must be such as to permit contact between the backs of the roaches entering the trap and the top of the opening. This vertical dimension, defined by the letter "a", will be vary with the type of roaches being trapped but is generally within the range of from 4 to 10 mm.

From the standpoint of maximizing the thigmotropic stimulatory effect to be derived from the vertical edges of the openings, the lateral dimension of the openings is not critical, since it is not believed that the vertical side edges provide any of the desired thigmotropic effect. It is desirable, however, to make the opening as narrow as possible so as to minimize the amount of light reaching the interior of the traps while allowing sufficient width to permit the passage of roaches through the openings. For this purpose openings from about 10 to 20 mm. wide are suitable.

It is preferred, for several reasons, to provide the cover with the above-described tabs 11 which can be opened and closed. For example, prior to use and with the tabs closed, a sticky coating composed of an adhesive-bait attractant composition, indicated at 9 in FIG. 1, is kept fresh, and the tabs can be snapped back into place to close the trap and facilitate disposal.

Figure 4:
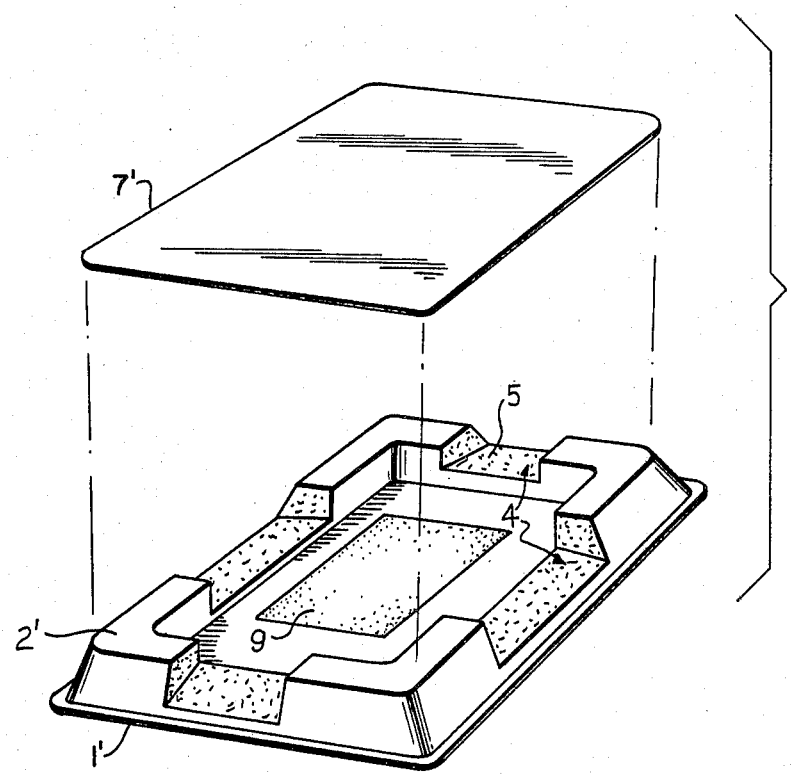
FIG. 4 is an exploded view in perspective of a further embodiment of the invention wherein the cover plate is heat-sealed to the roach collecting tray.

In an alternative embodiment, depicted in FIG. 4, a cover plate 7' is heat-sealed directly to the roach collecting tray 1' which is composed of a bottom having the adhesive-bait attractant composition 9 thereon and walls 2' around the periphery thereof, the walls having one or more roach admitting openings 4, each opening being defined by side walls and a stepping plate with roughened surface 5. In this embodiment, in which flaps 8 having perforations 10 and tabs 11, as shown in FIG. 1 are eliminated, the need for flange 3 and groove 6 is obviated, and these latter features can likewise be eliminated from the roach collecting tray.

The cover can be formed of any suitable material such as paper board, polyethylene or the like.

Figure 2:
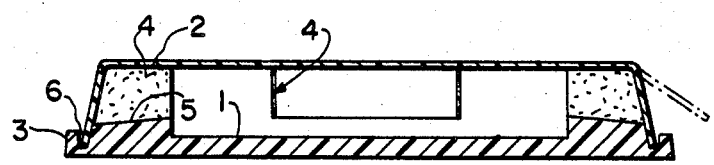
FIG. 2 is a sectional view of the trap of FIG. 1 taken along lines A—A'.

FIG. 2 depicts a sectional view of the trap of FIG. 1 taken along line A—A', in which like numerals correspond to like parts.

Figure 3:
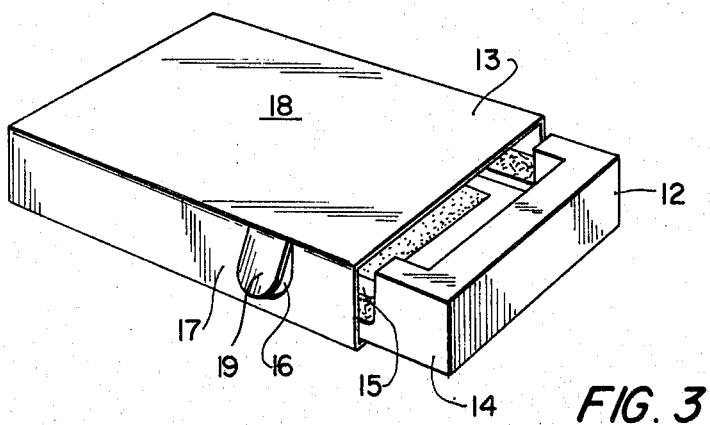
FIG. 3 is a perspective view of another embodiment of the present invention wherein the roach collecting tray slides into a sleeve.

FIG. 3 depicts another embodiment which employs the same principle as the one described above but which has a sliding tray configuration.

In this embodiment, the roach collecting tray 12 slides into sleeve 13 which comprises a box open at at least one end, i.e. consisting of a top wall 18 having at least two parallel side walls 17 dependent therefrom and connecting said top wall to a bottom wall (not shown). Optionally, the box can have an end wall (not shown) joined at its four edges to the said top 18, bottom and dependent side walls 17.

The roach collecting tray is essentially that of the previous embodiment except that it does not have an outer wall or flange, and the wall 14 which surrounds it is substantially vertical.

Wall 14 has at least one roach admitting opening 15 therein, with a roughened surface at the bottom thereof (not shown).

The sleeve has at least one perforation 16 in the side wall 17, which perforation is aligned with the opening 15 in the wall of the tray and defines an entrance into the trap.

The perforation 16 is covered by tab 19 which can be punched out as in the previous embodiment.

Tab 19 is hinged to top wall 18 of said sleeve over perforation 16, and the tab operates as do the tabs of the foregoing embodiment.

The tab adjoined to top wall 18 at the top of perforation 16 is so positioned as to contact the roach entering the trap.

FIG. 4 depicts an embodiment which includes thermoformed tray 1' having roach admitting openings 4 with entry into the trap via ramps 5. Cover 7' is heat sealed to the top of wall 2' of tray 1'.

Figure 5:
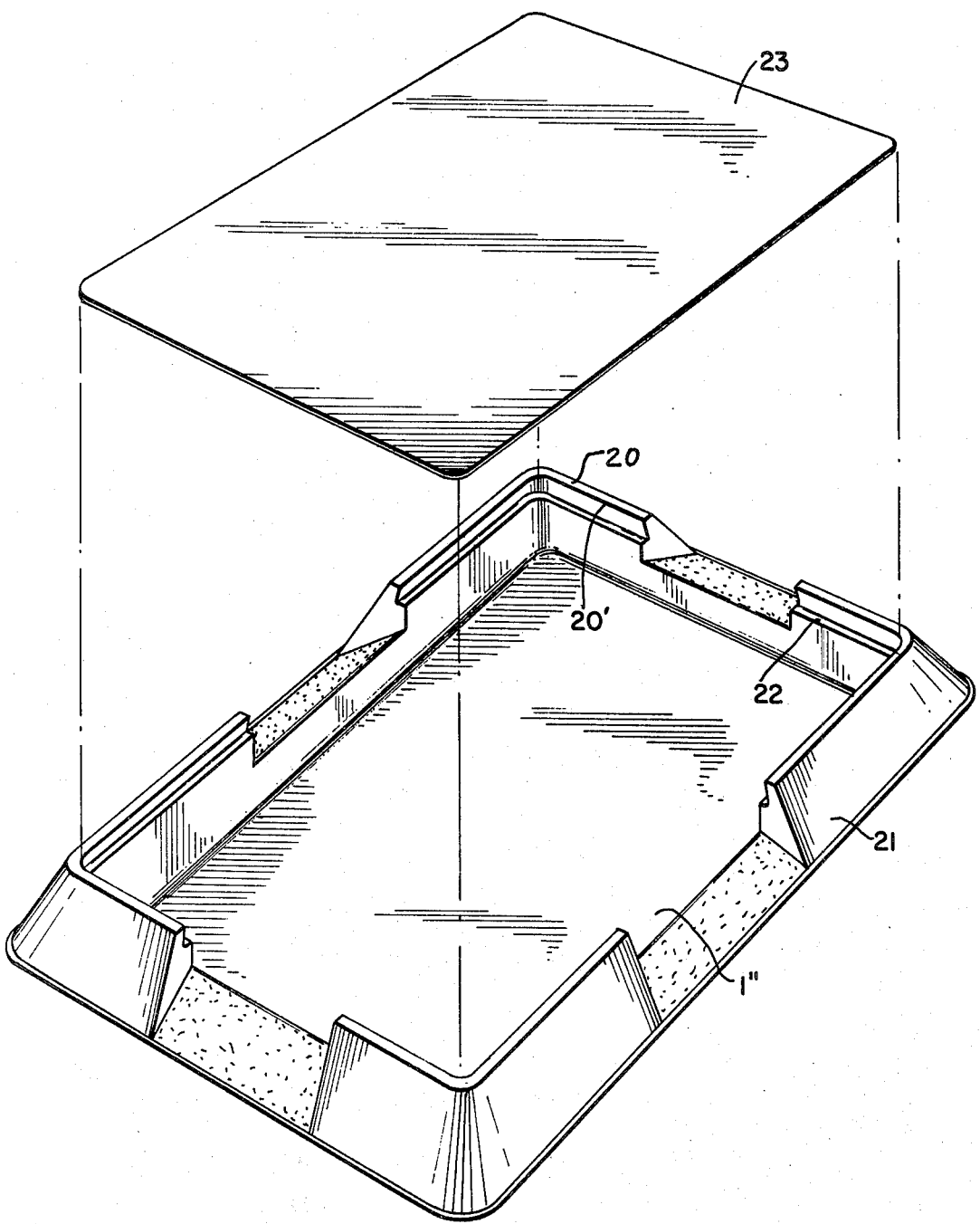
FIG. 5 is an exploded view of a still further embodiment of the invention where the cover plate snaps into the top of the tray.

FIG. 5 depicts an embodiment similar to that of FIG. 4 except that the cover snaps into the wall structure. Thus, tray 1" is surrounded by relatively thick wall 21, with horizontally protruding ledge 22 disposed along the inner surface of wall 21 just below the top surface 20 of said wall. Flat cover 23 is snappingly engaged with the reentrant portion 20' of wall 20 so as to be retained on ledge 22.

Figure 6:
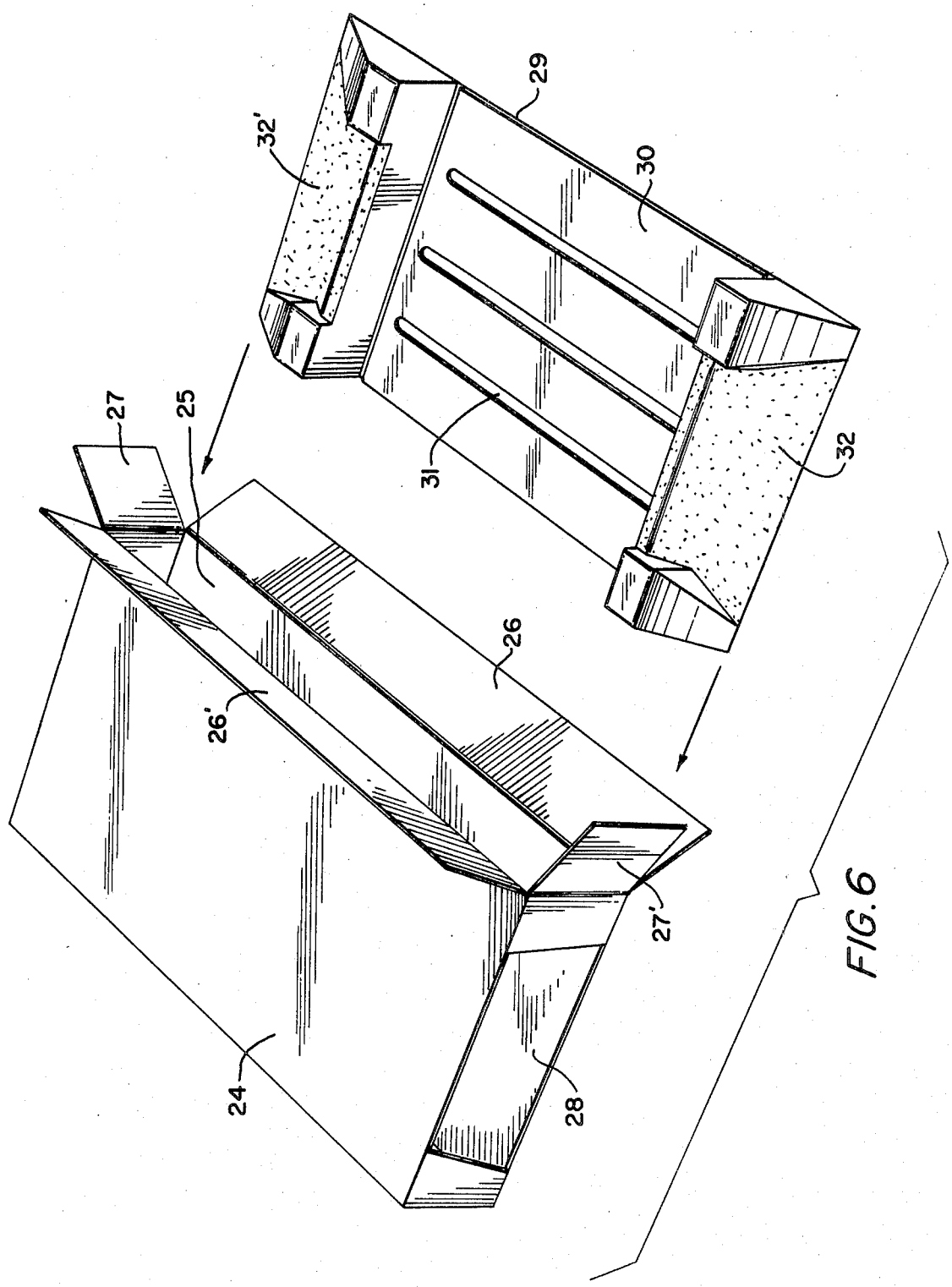
FIG. 6 is an exploded view, in perspective, of an embodiment of the present invention in which the tray is disposed within a box.

FIG. 6 depicts an embodiment in which there is provided box 24 having a substantially rectangular opening 25 on one side surface thereof, said opening being surrounded by top and bottom flaps 26 and 26' and side flaps 27 and 27', and on at least one adjacent side surface, a perforated portion which may be punched open to form a roach admitting opening 28.

Said substantially rectangular opening 25 is adapted to receive substantially rectangular tray 29 and snugly retain said tray in said box.

Tray 29 comprises base 30 to which adhesive bait is affixed and is provided with stiffening ribs 31. At each end of base 29 are provided wedge shaped ramp members 32 and 32'.

When tray 29 is inserted in box 24, side flaps 27, 27', bottom and top flaps 26 and 26' are closed and the perforated portion is punched out to form roach admitting opening 28, said ramp members define the base of said roach-admitting opening and the top surface of box 24 defines the top of said opening.

To assemble the foregoing traps, one only need snap the cover into place in the embodiment of FIG. 1, slide the tray into place in the embodiment of FIG. 3, heat seal the cover plate 7' to tray 1' in the embodiment of FIG. 4 or snap cover 23 into tray 20 in FIG. 5.

In FIG. 6, the trap is assembled by inserting tray 29 into opening 25 and closing the flaps 26, 26', 27 and 27' adjacent said opening. Then, said at least one perforated portion 28 is punched open to expose said ramp members 32 and 32'.

Conventional adhesive formulations in conventional amounts are employed in the foregoing embodiments. The adhesive-bait attractant 9 is applied to the bottom of the inside of the tray as shown in FIG. 1.

Numerous variations and modifications of the foregoing can be made without departing from the scope of the invention as defined in the appended claims.

I claim:

1. A roach trap comprising:
   (a) an open topped roach collecting tray having inner and outer walls around the periphery thereof, said inner wall being upwardly and inwardly sloped with respect to said outer wall and defining a groove with said outer wall, said inner wall being relatively thicker and higher than said outer wall, said inner wall having at least one roach admitting opening therein with a rough surface at the bottom thereof, said outer wall being sufficiently low to permit a roach to traverse it for entering the trap through said opening in said inner wall, the bottom of said tray having an adhesive bait coated thereon to prevent the roach from escaping; and
   (b) a cover for said tray comprising a flat panel having flaps depending from the periphery thereof, said flaps being removably engaged in and retained in said groove and fitting snugly against said inner walls, said flaps having at least one perforation defining an entrance to said trap, the perforation defining an opening the top of which is positioned to contact the top of a roach entering the trap.

2. The roach trap according to claim 1, wherein said tray is made of thermoformed plastic.

3. The roach trap according to claim 2, wherein at least the inside of said trap is colored black.

4. The roach trap according to claim 3 wherein the bottom of said roach admitting opening having roughened surface is upwardly inclined in the inward direction.

5. The roach trap according to claim 1 further comprising a tab hinged to said cover over the perforation in said cover and swingable in relation to said flap, whereby said tab can be swung to the outward position when the trap is open and in use and to the closed position after use.

* * * * *